Feb. 14, 1967    R. E. DOERFLER    3,304,130
HYDRAULIC VALVES

Filed July 2, 1965    7 Sheets-Sheet 1

INVENTOR:
ROGER E. DOERFLER
BY Howson & Howson
ATTYS.

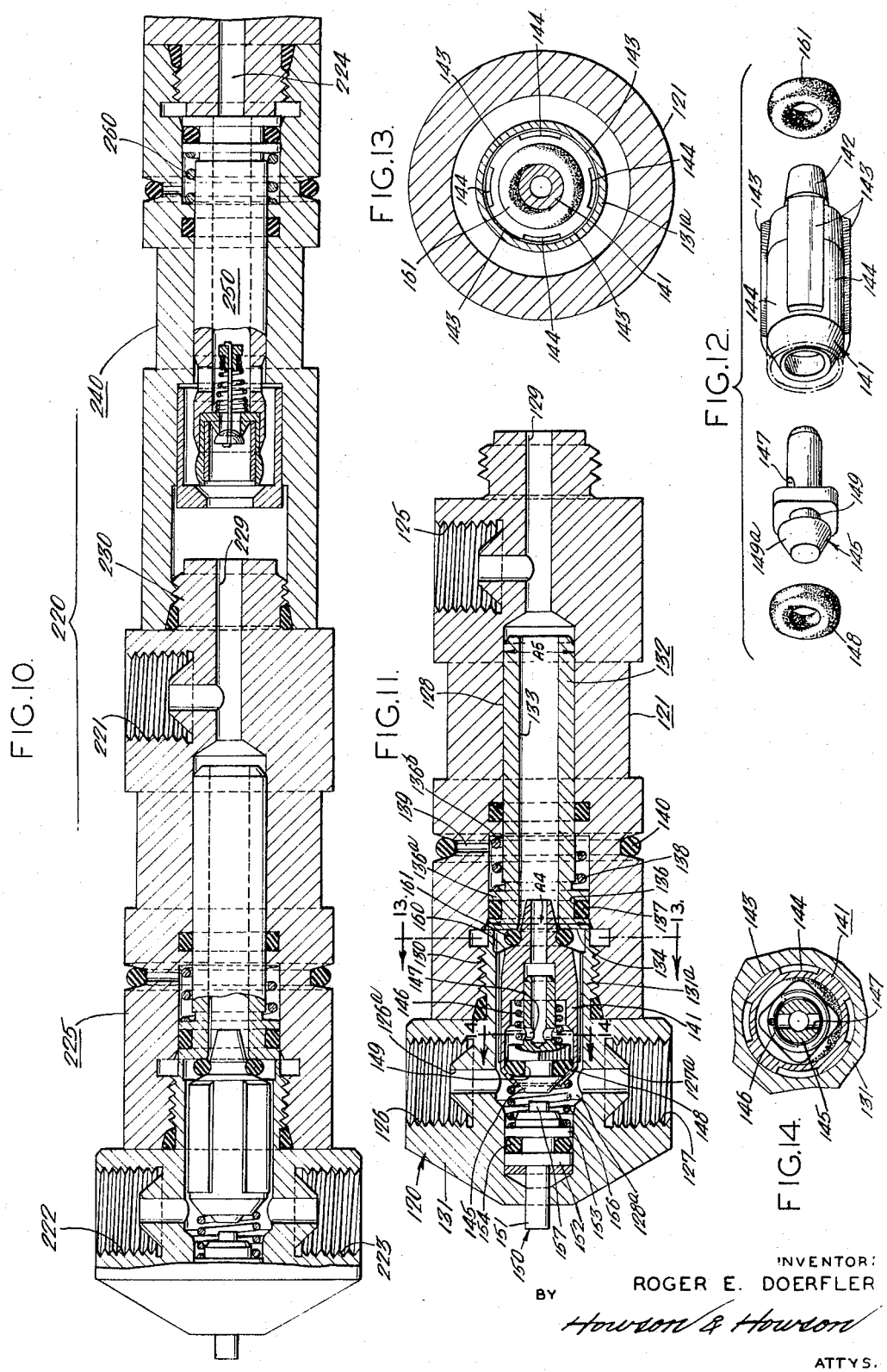

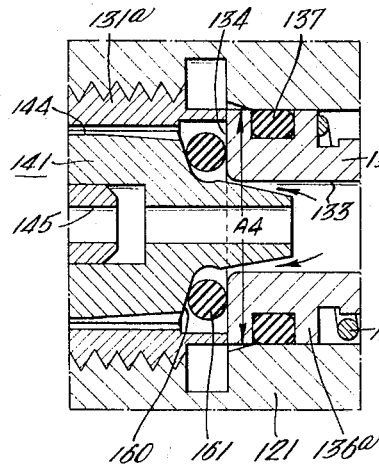
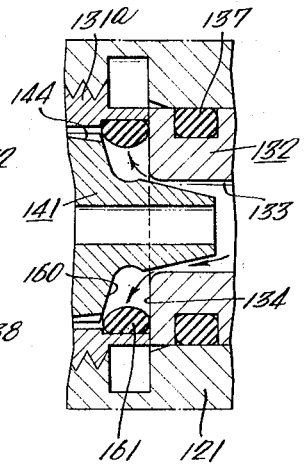
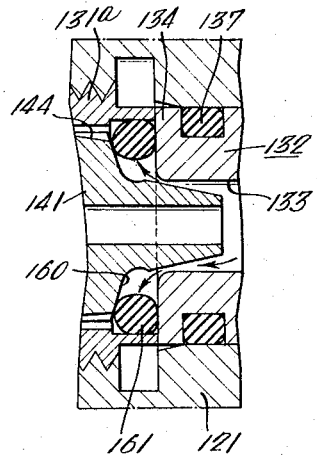
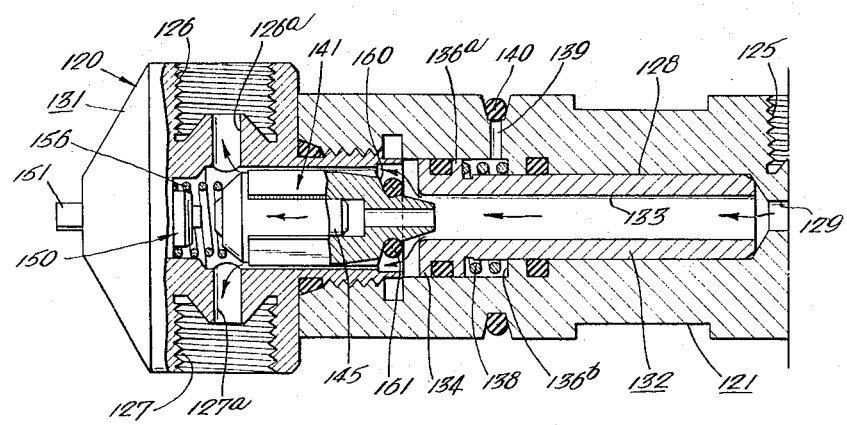

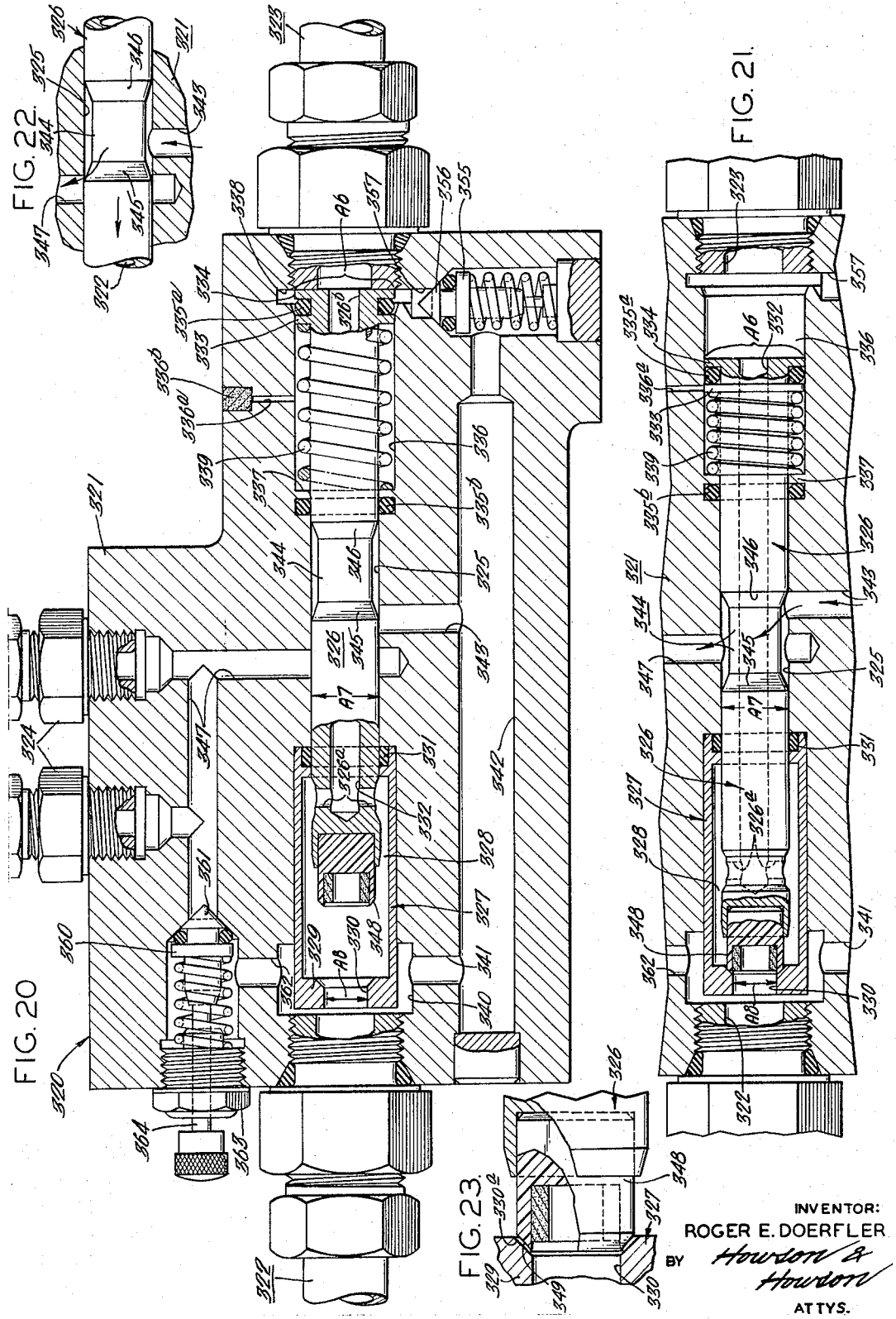

Feb. 14, 1967  R. E. DOERFLER  3,304,130
HYDRAULIC VALVES
Filed July 2, 1965  7 Sheets-Sheet 6
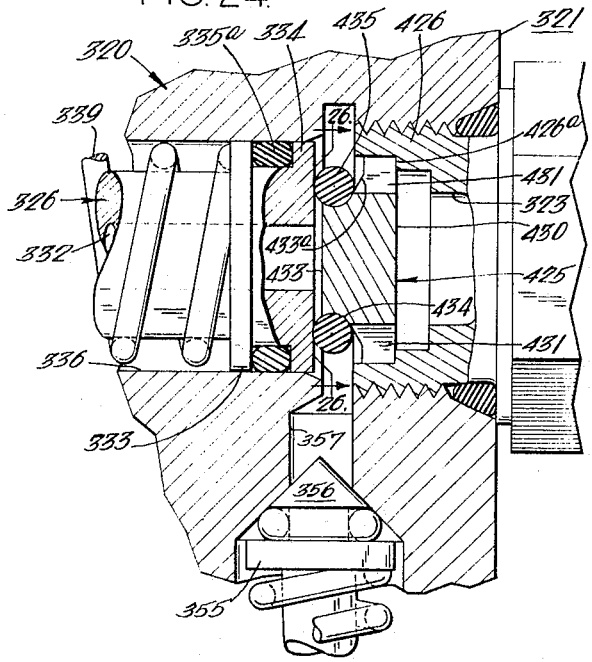
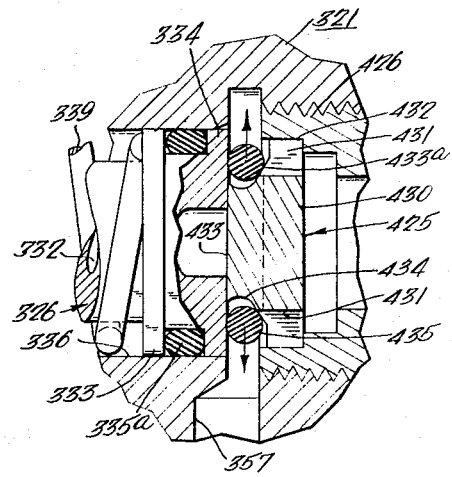
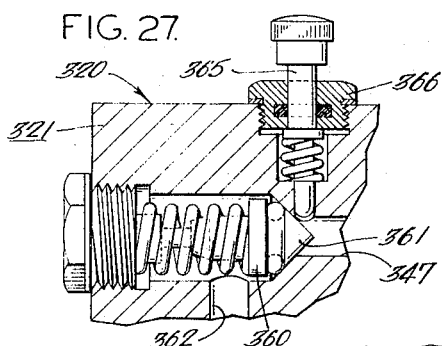
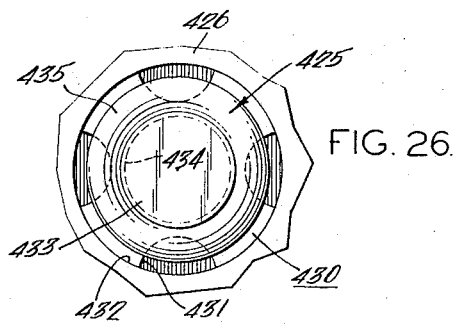
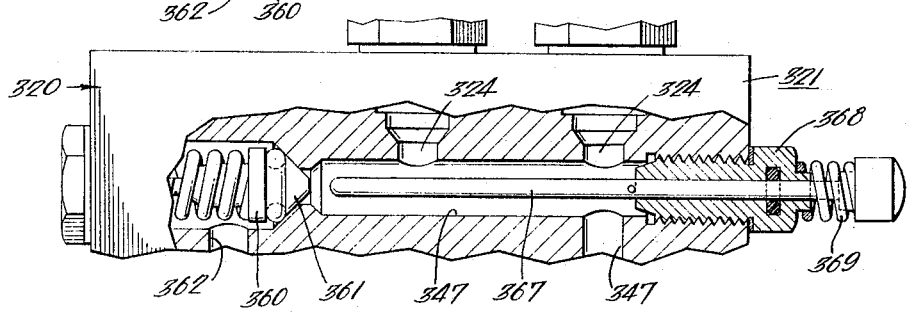
INVENTOR:
ROGER E. DOERFLER
BY
Howson & Howson
ATTYS.

Feb. 14, 1967  R. E. DOERFLER  3,304,130
HYDRAULIC VALVES

Filed July 2, 1965  7 Sheets-Sheet 7

INVENTOR:
ROGER E. DOERFLER
BY Howson & Howson
ATTYS.

United States Patent Office 3,304,130
Patented Feb. 14, 1967

3,304,130
HYDRAULIC VALVES
Roger E. Doerfler, Baltimore, Md., assignor to Hydrasearch Co., Inc., Annapolis, Md., a corporation of Maryland
Filed July 2, 1965, Ser. No. 469,271
25 Claims. (Cl. 303—6)

This application is a continuation-in-part of application S.N. 431,247, filed on February 9, 1965, and application S.N. 460,800, filed on June 2, 1965, now abandoned.

The present invention relates to metering, proportioning and delay valves and more particularly to hydraulically operated metering, proportioning and delay valves which provide automatically a programmed but variable differential hydraulic pressure between the front and rear brake systems of motor vehicles.

As is well known, conventional automotive braking systems for automobiles having engines mounted in the front end of the automobile require differential braking forces in order that the automobile may be stopped smoothly and that the brakes themselves may wear evenly. As the weight distribution of most automobiles having engines mounted in the front end is approximately 60% forward and 40% rearward, the brakes mounted on the front wheels of the vehicle provide 60% of the total braking force while the brakes mounted on the rear wheels afford 40% of the braking force. Conventionally this is accomplished by providing 60% of the total brake area on the front brake shoes and 40% of the total brake area on the rear brake shoes, which area distribution enables equal static hydraulic pressure to be applied to the rear and forward brake cylinders.

In certain automotive braking systems, it has been found desirable to combine the disc type brake with the conventional shoe type brake. As is well known, the disc brake permits of an increase in applied braking pressure, and thus, an increase in the rolling friction of the tires against the surface upon which they are riding, without locking. Further, even under adverse weight conditions brake fade is almost non-existent. Hybrid systems combining disc and shoe type brakes, however, create serious problems as to differential braking pressures between that required by the shoe brake, just prior to locking, and that required by the disc brake. Thus a solution as to providing differential pressures between the front and rear brake systems cannot be solved by merely providing a difference in brake area, but it becomes necessary to provide a valving system which permits increased pressure to be applied to the disc type brakes, in certain instances, above that applied to the shoe type brakes, and on a proportional basis.

Another problem that exists with the hybrid type brake system and even with brake systems having all four wheels mounting disc type brakes, is caused by the sensitivity of the disc type brakes. The problem is caused by the motor vehicle operator who "rides the brakes" and becomes increasingly serious on braking systems having power assists, sometimes referred to as "power brakes." "Brake pedal riding" causes unintentional frictional engagement of the discs which results in, over a period of time, boiling away of the hydraulic fluid in the brake lines, which boiling away may result in complete brake system failure.

There are several combination valving systems presently being used to accomplish the desirable proportioning between front and rear brakes having disc and shoe brake systems respectively. The most common answer has been a combination of valves working on the mechanical spring action and hydraulically balanced pressure principal. In addition, to this date there has been no successful valve which prevents engagement of disc brakes when the brake is being "ridden," or which may, in addition, be used in conjunction with a proportioning valve.

In view of the above it is an object of the present invention to provide a valve or valve combination which proportions, and/or meters, and/or delays the communication of hydraulic pressure, for example: wherein it is desired to increase the hydraulic pressure on one of the brake systems to compensate for different brake systems located in the front or rear of a vehicle, and/or differences in weight distribution in the vehicle to which it is connected; and/or where desired permit the addition of a delay function to prevent the deleterious effects of "riding" of the brakes.

Another object of the present invention is to provide a proportioning valve which in addition to relying solely upon hydraulic imbalance to establish the proportioning ratio, programs a sequencing function independently of the proportioning function.

Another object of the present invention is to provide a proportioning and metering valve combination which in addition to relying solely upon hydraulic imbalance to establish the proportioning ratio, programs a sequencing function independently of the proportioning function.

Another object of the present invention is to provide a proportioning and/or metering valve for use in an automotive braking system having front disc brakes and rear drum and shoe brakes.

Still another object of the present invention is to provide a proportioning or metering and proportioning valve for brake systems having shoe type brakes on the rear wheels of a vehicle and disc type brakes on the front wheels of a vehicle, which valve permits the retention of a small amount of pressure on the rear shoe type brakes so as to compensate for any looseness in linkage.

Another object of the present invention is to provide means in a metering and proportioning valve which permits easy bleeding of the brake system.

Another object of the present invention is to provide a delay valve which may be used alone or in conjunction with the proportioning valve of the present invention to prevent foot pedal pressure from acting on the disc type brake system until a predetermined pedal pressure is applied.

Other objects and a fuller understanding of the invention may be had by referring to the following description and claims taken in conjunction with the accompanying drawings in which:

FIG. 10 is an enlarged fragmentary sectional view of the metering, proportioning and delay valve illustrated in FIG. 4;

FIG. 11 is an enlarged fragmentary sectional view of the metering and delay valve illustrated in FIG. 3;

FIG. 12 is an enlarged, exploded, perspective view of a portion of the valve illustrated in FIG. 11;

FIG. 13 is a sectional view taken along line 13—13 of FIG. 11;

FIG. 14 is a fragmentary sectional view taken along line 14—14 of FIG. 11;

FIGS. 15–17 are fragmentary enlarged sectional views of a portion of the valve illustrated in FIG. 11 and showing progressive positions of certain apparatus therein upon application of brake pressure;

FIG. 18 is a fragmentary sectional view of the valve illustrated in FIG. 11 with portions of the apparatus thereof in different positions;

FIG. 19 is an enlarged fragmentary sectional view of a portion of the valve illustrated in FIG. 18 and showing certain apparatus in a different position upon the release of brake pressure;

FIG. 20 is an enlarged fragmentary sectional view of the valve illustrated in FIG. 5;

FIG. 21 is a fragmentary sectional view of the apparatus illustrated in FIG. 20 showing a portion of the apparatus in a different position;

FIG. 22 is a fragmentary view of a portion of the apparatus illustrated in FIG. 21 and in another position;

FIG. 23 is an enlarged fragmentary view of the portion of the apparatus illustrated in FIG. 21;

FIG. 24 is an enlarged fragmentary sectional view of a portion of the device illustrated in FIGS. 20–23 and showing certain additional apparatus for use in conjunction with the valve of the present invention to maintain a residual pressure upon the shoe type brake system upon release of the brake;

FIG. 25 is another view of the apparatus illustrated in FIG. 24 in a different position;

FIG. 26 is a sectional view taken along line 26—26 of FIG. 24;

FIG. 27 is a fragmentary sectional view of another embodiment of a bleader mechanism for use in conjunction with the valve shown in FIGS. 20–23;

FIG. 28 is an additional embodiment of bleeder mechanism for use in conjunction with the valve shown in FIGS. 20–23;

Introduction

Figure 1:
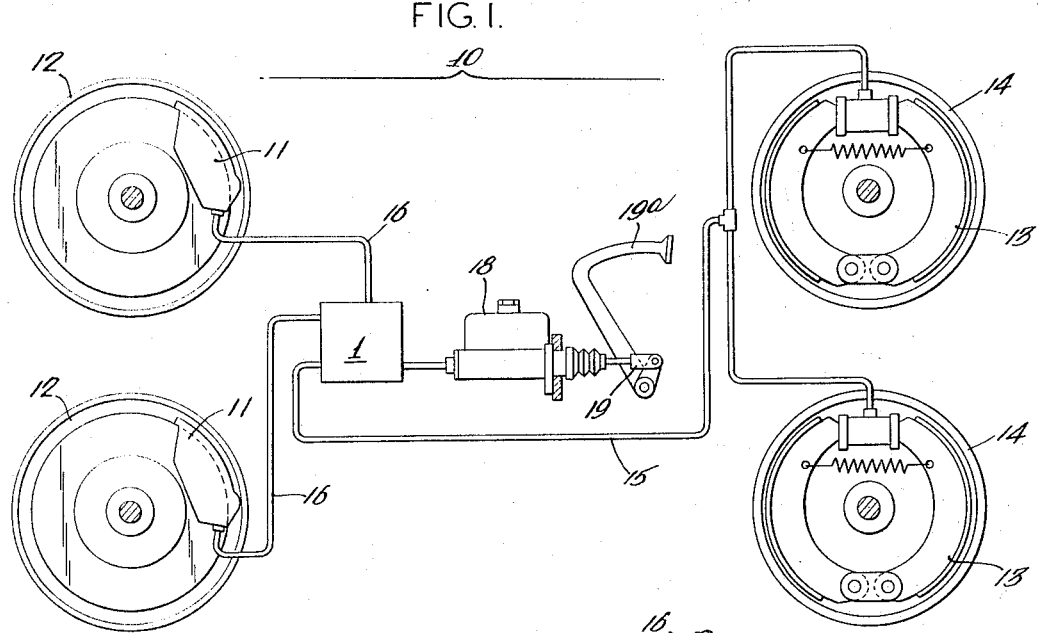
FIG. 1 is a schematic diagram of a brake system comprising conventional shoe and drum rear mounted brakes, and conventional front mounted disc brakes and having a blank box for incorporating a valve or valve combination constructed in accordance with the present invention and as shown in FIGS. 2–5 respectively.

Referring now to the drawings, and especially FIG. 1, a brake system 10 is schematically illustrated therein comprising, in the present instance, caliper type disc brakes 11 mounted on front wheels 12 and shoe type brakes 13 mounted on rear wheels 14. Connecting the shoe brakes 13 is hydraulic piping 15 which emanates from a blank box 1 which may house a novel valve constructed in accordance with the present invention. Connecting the disc brakes 11 is hydraulic piping 16 emanating from the blank box 1, which blank box is connected to a conventional master cylinder 18. As is conventional, the master cylinder 18 is actuated by linkage 19 and the usual foot pedal 19a.

Figure 2:
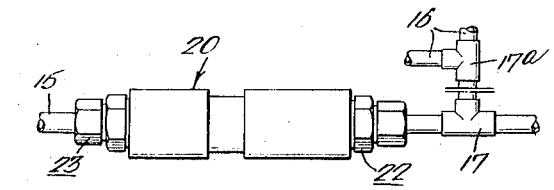
FIG. 2 is a enlarged profile of a proportioning valve for placement in the blank box illustrated in FIG. 1.

In FIGS. 2–5 are illustrated profile or side elevational views of valves to be placed within the blank box 1 illustrated in FIG. 1, which valves are constructed in accordance with the invention. As the specification is divided into sections which deal specifically with the workings of each of the valves illustrated in FIGS. 2–5, suffice to say at the present time that FIG. 2 illustrates a proportioning valve 20, FIG. 3 a metering and delay valve 120, FIG. 4 a metering, delay and proportioning valve 220, and FIG. 5 a metering and proportioning valve 320.

Proportioning valve

It has been discovered that in certain braking systems, such as the hybrid brake system illustrated in FIG. 1 and heretofore described, as well as brake systems which incorporate all shoe or disc type brakes and weight distribution is a factor to be reckoned within designing the brake system, it is desirable that a proportioning valve be provided to compensate for differences in weight or differences in systems so as to enable differentiation of the braking pressure applied to the front and rear brakes.

In accordance with the invention, the proportioning valve 20 proportions and programs the sequential operation of the hydraulic pressure to, in the illustrated instance, the shoe brakes 13, solely by hydraulic balance. To this end, the valve 20 comprises a valve body 21 having a hydraulic fluid inlet 22 and at least one hydraulic fluid outlet 23. As illustrated in FIG. 2 the outlet 23 is connected to the rear shoe brakes 13 via the hydraulic piping 15 while the inlet 22 is connected through a T 17 to the master cylinder 18 while the connection from the master cylinder 18 to the front disc brakes 11 is through another T 17a which connects the hydraulic piping 16. In the present instance, the inlet and outlet connections to the body 21 comprise nipples 22a and 23a respectively.

Figure 6:
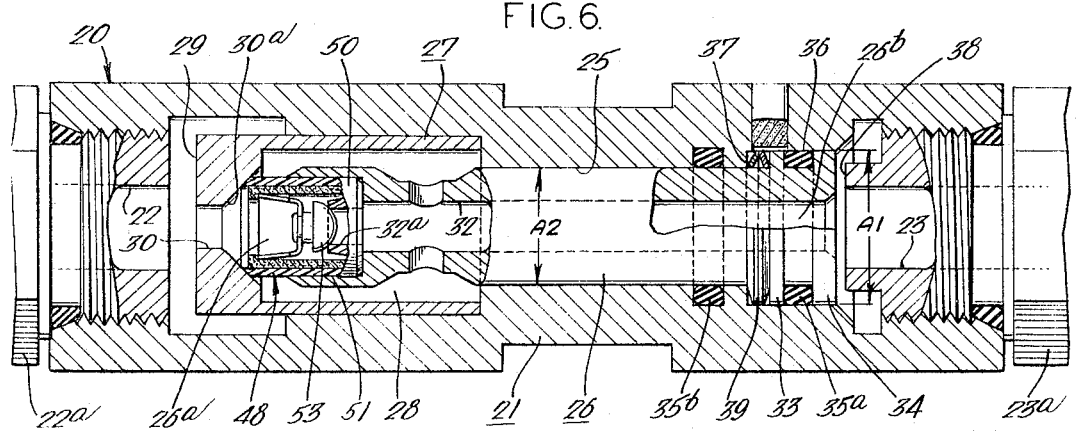
FIG. 6 is an enlarged fragmentary sectional view of the proportioning valve illustrated in FIG. 2.

Referring now to FIG. 6, between the inlet 22 and the outlet 23 is a bored hole 25 having slidingly mounted therein a spool 26, the spool having an inlet end 26a and an outlet end 26b and movable between a first position, to the right and a second position, to the left. Adjacent the inlet 22 and mounted within the body 21 is a sleeve 27 having a hollow interior forming a first chamber 28, communicative at one end 29 through a passage 30 with the inlet 22, and circumscribing the inlet end 26a of the spool 26.

In order to provide communication between the inlet 22 and the outlet 23 so that hydraulic pressure applied at the inlet 22 may also be applied at the outlet 23, the spool 26 contains means defining an aperture or conduit 32 connecting the chamber 28 and the outlet 23.

At the outlet end 26b of the spool 26 are a pair of spaced annular shoulders 33 and 34 having an annular seal 35a, such as an O-ring, mounted therebetween. The shoulders 33 and 34 are positioned in a second chamber 36 formed in the body 21 and having an axially spaced radially extending end wall 37, the forward end of the nipple 23a forming the other end wall 38. A second seal 35b is positioned adjacent the wall 37 and sealingly engages the exterior of the spool 26. Between the end wall 37 and the first shoulder 33 of the spool 26, is biasing means, in the present instance a conical compression spring 39 which tends, prior to the application of hydraulic pressure to the spool through the inlet 22, to keep the spool in its first position, i.e. towards the right.

In order to permit axial movement of the spool 26 between its first and second positions, solely by hydraulic imbalance, and to permit the movement of the spool to overcome the compression of the spring 39, the area of the second shoulder 34, exposed to the hydraulic fluid at the outlet 23 and designated A–1 for purposes of identification, is greater than the area A–2 exposed to the hydraulic pressure from the inlet 22. Thus, upon receipt of sufficient pressure to overcome the spring force, the spool moves to the left until the resultant hydraulic force exerted against the area A–1 is equal to the sum of the resultant hydraluic force exterted against the area A–2 and the spring force. At this position a state of balance will occur.

At a predetermined pressure it is desirable to lower the rate at which the pressure applied to the rear shoe brakes 13 through the outlet 23 increases, while maintaining the pressure rate increase to, in the present instance, the forward disc brakes and from the master cylinder, undiminished. One of the reasons for proportioning the pressure in this manner is that increased braking pressure may be applied to disc brakes without locking the brakes which is not true of shoe-type brakes. Thus the point at which the hydraulic pressure rate increase, going to the shoe type brakes, should taper off, is one that must be picked for each individual system dependent upon the surface area of the shoes and other well known factors. In the present instance, the proportioning valve 20 programs the decrease in hydraulic pressure rate to the rear brakes 13. As hydraulic pressure increases, the spool 26 gradually moves to the left until it reaches a position closing off the first chamber 28. To this end, the inlet end 26a of the spool 26 has a nose cone 48 connected thereto, which nose cone includes a conical or tapered lip portion 49 for seating in a like conical seat 30a in the passage 30 of the sleeve 27.

In accordance with a feature of the invention, the nose cone 48 comprises a cylindrical insert 50 connected to one end of the spool 26, in the present instance force fitted inside a cylindrical receiving chamber 51, and having interiorly mounted therein a stiffening member 52. (See FIG. 7.) It should be noted that the stiffening member 52 has a leading edge 52a axially spaced interiorly of the conical lip 49 of the cylindrical insert 50. Preferably the cylindrical insert 50 is constructed of a stiff yet resilient material such as nylon, while stiffening member 52 is preferably composed of a material that is hydraulically transparent to support the cylindrical insert 50. Such a hydraulically transparent material is sintered porous bronze which tends to restrain the cylindrical insert 50 upon contact with the tapered lip 49 with its associated seat 30a in the sleeve 27, while permitting the pressure to act on the internal diameter of the cylindrical insert and thus aid the sealing action of the lip 49 against the seat 30a.

When the spool 26 is in its second position and the nose cone 48 is positioned in the seat 30a of the sleeve 27, as illustrated in FIG. 6, a different area, designated in the present instance, A–3 (see FIG. 7), is exposed to the hydraulic pressure from the master cylinder 18. In the present instance, the area A–3 is less than either the area A–1 or A–2, whereby, after the valve has reached the second position, the pressure at the outlet 23 will remain at the pressure which caused the spool 26 to reach the second position, plus the ratio of A–3:A–1 times the difference between the new hydraulic pressure at the inlet 22 and the pressure of closing.

Figure 7:
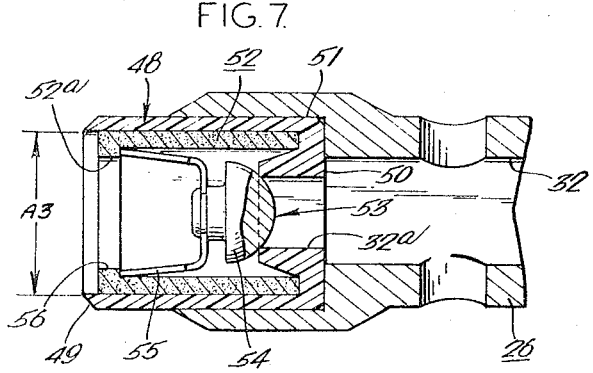
FIG. 7 is an enlarged fragmentary sectional view of a portion of the proportioning valve illustrated in FIG. 6.
Figure 8:
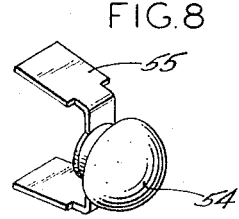
FIG. 8 is a perspective view of a portion of the valve illustrated in FIGS. 6 and 7.

Upon release of the foot pedal 19a, and reduction of the hydraulic pressure to the inlet 22, it is desirable that the rear brakes 13 as well as the disc brakes 11 be immediately de-energized. To this end, the conduit 32 extends interiorly of the stiffening member 52 and contains therein a check valve 53 biased normally closed to seal the conduit 32 from communication with the inlet 22. To this end, and as illustrated in FIGS. 7 and 8, the check valve 53 may comprise a ball 54 normally sealed against an aperture 32a in the cylindrical insert 50 and having a biased leaf spring 55 engaging a lip 56 of the stiffening member 52. Thus, upon release of pressure at the inlet 22 the hydraulic pressure existing in the conduit 32 causes the ball 54 to be moved to the left (as viewed from FIG. 7) allowing fluid communication between the outlet 23 and the inlet 22 and thus relieving the pressure on the shoe brakes 13. At this point, the spool 26 will move to the right and permit normal access of the conduit 32 with the chamber 28 and the inlet 22.

Figure 9:
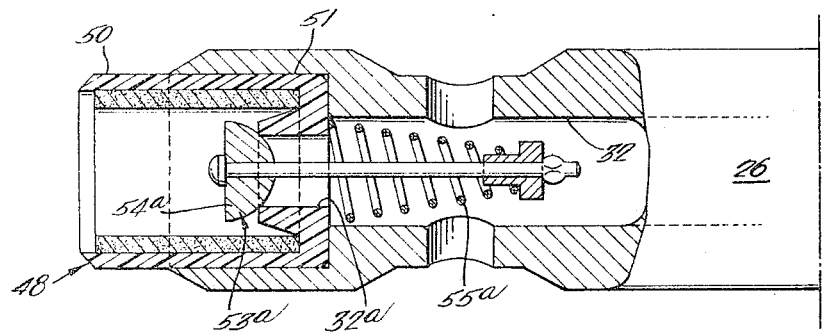
FIG. 9 is an enlarged fragmentary sectional view of another embodiment of a proportioning valve constructed in accordance with the present invention.

Another embodiment of a check valve which is biased normally closed to seal the conduit 32 from communication with the inlet 22 is illustrated in FIG. 9. To this end, a check valve 53a comprises a ball 54a normally sealed against the aperture 32a in the cylindrical insert 50. In this instance a compression coil spring 55a is positioned in the conduit 32 whereby upon release of pressure at the inlet 22, the hydraulic pressure existing in the conduit 32 causes the ball 54a to be unseated (i.e. moved to the left as viewed in FIG. 9) allowing fluid communication between the outlet 23 and the inlet 22 and thus relieving the pressure on the shoe brakes 13.

Figure 30:
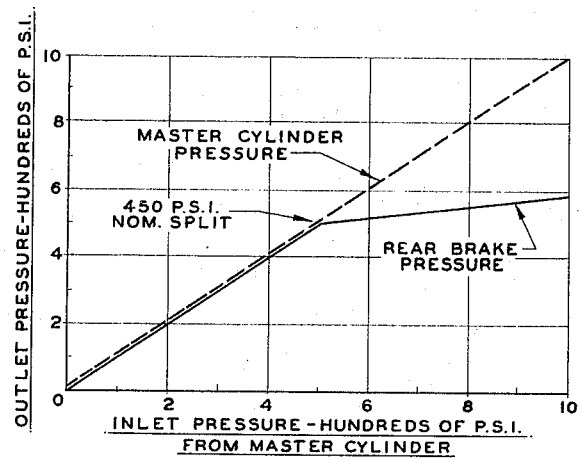
FIG. 30 is a graphic representation of a typical set of operating conditions for a proportioning valve constructed in accordance with the present invention, having inlet pressure from the master cylider as tre abscissa and outlet pressure as the ordinate.

A typical proportioning valve characteristic graph is shown in FIG. 30 and shows the point at which rear brake pressure may be diminished while leaving undiminished the master cylinder pressure. In the present instance the areas A–1 and A–2 have been selected so that the spool 26 moves into the second position upon the master cylinder pressure reaching approximately 450 pounds per square inch. The area A–3, in a like manner, has been selected so that a further increase in master cylinder pressure results in a proportional decrease in the rate of increase of pressure to the rear brake shoes.

Thus the proportioning valve of the present invention may be utilized in conjunction with both disc and shoe type brakes or a hybrid system to permit a proportioning of hydraulic pressure, at any pressure point desired and which permits establishment of the proportioning ratio solely by hydraulic imbalance.

*Metering and delay valve*

With the advent of disc type brakes whether on all four wheels or just on the front as in the hybrid system depicted in FIG. 1, it was discovered that due to the disc brakes' inherent sensitivity even a small brake pedal pressure will cause engagement of the disc and if the driver of the motor vehicle tends to "ride" the brakes the friction of the disc causes the brake fluid to boil and evaporate in the system ultimately resulting in loss of the entire brake system. In addition, if the brakes on the motor vehicle are to take the form shown in FIG. 1, i.e. a hybrid form comprising forward disc brakes and rearward shoe brakes, the inherent slack in the shoe type brake system must be taken up prior to their engagement. Accordingly, the flow to the forward disc brakes must be metered with respect to the pressure application to the rear shoe type brakes.

In addition, when all of the brakes on the motor vehicle are of the disc type, in order to improve braking and increase operator safety while obtaining a smoother "feel" to the brakes, it may be desirable to delay the application of pressure to the front brakes in order to permit the rear brakes to act as a retardant to the forward motion of the vehicle. Thus the delay valve may act to place a drag on the vehicle by permitting actuation first of the rear brakes whereby the inertia or momentum of the vehicle is stabilized prior to the application of the front brakes.

Figure 3:
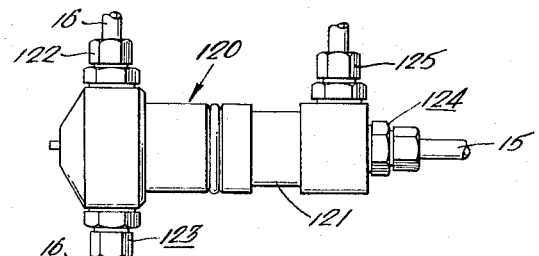
FIG. 3 is an enlarged profile of a metering and delay valve for placement in the blank box illustrated in FIG. 1.
Figure 4:
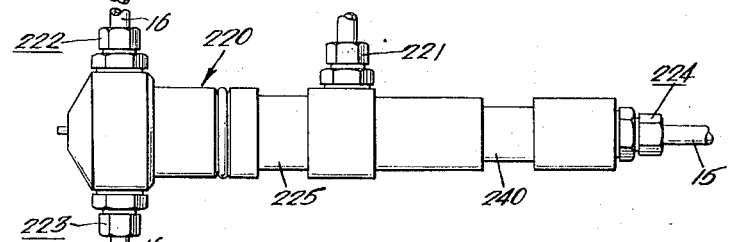
FIG. 4 is an enlarged profile of a metering, delay and proportioning valve for placement in the blank box illustrated in FIG. 1.

Referring first to FIG. 3, the metering and delay valve 120 comprises a body portion 121 having at one end thereof nipples 122 and 123 for connection to the hydraulic piping 16 connecting the disc brakes 11. A third nipple 124 connects the shoe type brakes 13 through the hydraulic piping 15 to the other end of the valve body 121. Another connector 125 provides the input connection from the master cylinder 18.

Referring now to FIG. 11, and in accordance with the invention, the valve body 121 has at least one inlet 125 from the master cylinder 18 and located at one end of the valve body 121 and at least one, in the present instance two outlets 126 and 127 at the other end of the valve body. As illustrated in FIG. 11, the valve body 121 has an axially extending bore 128 terminating at one end (right) in an outlet 129, to which is connected the nipple 124, and terminating at the other end in a threaded portion 130 to receive a head 131. As illustrated, conduits 126a and 127a extend radially inward towards the longitudinal axis of the valve and provide communication with a bore extension 128a interiorly of the head 131. Bleeder mechanism 150 which will be more fully described hereinafter, having in the present instance a pin 151 which projects from the head 131, is also housed in the bore extension 128a.

As illustrated in FIG. 11, the bore 128 houses a tubular spool or piston 132 having a conduit 133 therein the piston movable between a first position adjacent the outlet (to the left) and a second position adjacent the inlet upon application of pressure. (See FIG. 18.) As illustrated, the head end 134 of the piston 132 has a larger diameter and therefore a greater cross sectional area (designated A-4 for purposes of identification) than the other end 135 of the spool (having a cross sectional area designated A-5 for purposes of identification). The piston 132 has means defining an annular groove 136 in which is positioned an O-ring 137 and adjacent the groove 136 and spaced from the head end 134 is a circumferential shoulder 136a. Abutting the shoulder 136a is biasing means, in the present instance a spring 138 which is anchored against a second shoulder 136b in the valve body 121. As illustrated, the space housing the spring 138 is vented by an aperture 139 to the atmosphere via a sealing gasket or O-ring 140.

As seen in FIG. 11, the head 131 has an axially threaded extension 131a which mates with the threaded portion 130 of the valve body 121, and which houses in the bore extension 128a and interiorly of the extension 131a, a rigidly fixed poppet housing 141 having a conical trailing portion 142 which is coaxial with the axis of the piston 132 and projects a short distance into the conduit 133. It should be noted that the conical trailing portion is not inserted tightly into the conduit 133 but is spaced from the interior wall of the conduit 133, the reason for which will become more evident hereinafter.

As illustrated in FIGS. 12 and 13, the poppet housing 141 has exterior lands 143 and grooves or channel means 144, the lands 143 being secured to the head 131 and thus providing a path of fluid communication between the conduit 133 and the outlets 126 and 127 via the channels or grooves 144. The interior of the housing 141 is bored out so as to permit fluid communication between the conduit 133 and a check valve means 145, normally biased to the left or in the closed position to the outlets 126 and 127 by biasing means, in the present instance a coil compression spring 146. As illustrated in FIGS. 11, 12, and 19, the poppet or check valve 145 is apertured as at 147 to permit fluid communication with the interior of the housing 141, the fluid being prevented from passing into the outlets 126 and 127 by a gasket or O-ring seal 148 which is placed in an annular groove 149 adjacent the disc or plug 149a of the check valve 145. The purpose of the check valve 145 will become evident hereinafter.

In order to prevent fluid communication between the inlet 125 and the outlets 126 and 127 until a predetermined pressure is reached, which pressure will correspond to that applied by the driver of the motor vehicle if he rests his foot upon the brake, and in accordance with the invention, pressure sensitive means are provided to prevent the master cylinder pressure from reaching the front brake outlets until the predetermined pressure is reached. To this end, the trailing end of the poppet housing 141 is provided with a conical ramp 160 which is in the form of a frustum of a cone with, in the present instance, an included angle of approximately 130° and which ramp is symmetrically located about the axis of the piston 132. Although this angle is somewhat important, the included angle could just as easily be as high as 180° and as low as approximately 90°, however it has been found preferable to keep the included angle, for reasons which will become evident hereinafter, approximately 130°. Between the head end 134 of the piston 132 and the ramp 160 is a pressure sensitive means, for example a toroidal, radially expansible or elastomeric gasket means, in the present instance an O-ring 161 which is retained inwardly by the squeezing action between the head end 134 of the piston and the ramp 160.

The operation of the metering and delay valve may be best analyzed with reference to FIGS. 15–17 and FIG. 29. In operation, upon introduction of hydraulic pressure into the inlet 125 and through the conduit 133, and as no flow may occur through the poppet valve 145, as has previously been explained, fluid pressure will build up along the bottom of the O-ring 161, the hydraulic pressure therefore begins to cause outward radial movement of the gasket 161. The resistance to movement of the O-ring 161 is provided by the hoop stress developed in the gasket, the hoop stress developing a pressure in the gasket (acting as a viscous liquid) equivalent to the hydraulic pressure causing the stress. The gasket obeys Pascal's Law, and bears against the ramp and the head end 134 of the piston 132 with a pressure equivalent to the hydraulic pressure trying to escape between the gasket, ramp and head end surfaces. Thus, as the gasket expands radially outwardly, it continues to maintain a seal against passage of fluid in the conventional manner of an O-ring seal, despite the lack of radially outwardly external mechanical support. As input pressure continues to rise, the gasket 161 continues to move outwardly to maintain equilibrium between hoop stress and hydraulic pressure, which outward movement continues until the gasket has moved into contact with the internal cylindrical surface of, in the present instance, the axial extension 131a. At this time, any additional increase in hydraulic pressure is not resisted by an increase in hoop stress, because the gasket 161 is restrained from further radial outward movement by the internal cylindrical surface, and in lieu thereof the gasket bears against the ramp 160, the head end 134 of the piston 132, and the internal cylindrical surface, with a pressure equivalent to the additional hydraulic pressure input.

Figure 29:
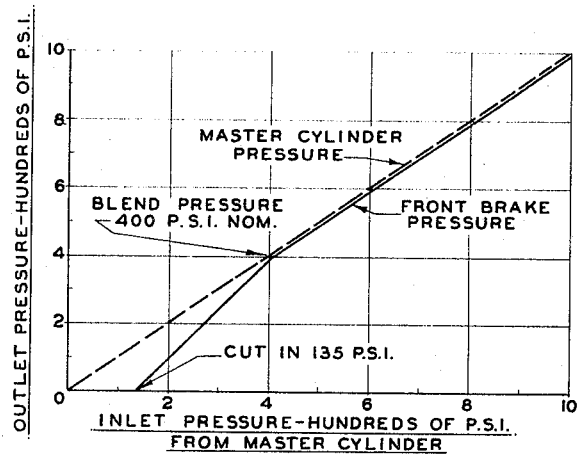
FIG. 29 is a graphic representation of a typical set of operating conditions for the metering and delay valve (FIGS. 3 and 10–19) having inlet pressure from the master cylinder as the abscissa and outlet pressure as the ordinate.

As illustrated in FIG. 16 the gasket which is preferably essentially circular in cross section in its relaxed state assumes a flattened elliptical configuration as best illustrated in FIG. 16 because of initial squeeze and the hydraulic input pressure. At this time, as the volume of the annular space between the head end 134 and the ramp 160 must be carefully chosen so that it is in excess of the volume of the gasket, an increase in presure upon the gasket causes it to flatten still further and permits hydraulic pressure to be communicated via the channels or grooves 144 exteriorly of the poppet housing 141. At this point, it is well to note, as illustrated in FIG. 29, that the initial diameter of the gasket 161 as well as its hoop stress per radial movement, in the present instance has been chosen to "crack" or open the inlet 125 to the outlets 126 and 127 at a pressure of between 125–150 p.s.i., in the present instance at approximately 135 p.s.i. It is also well to note that after "cracking," the rate at which fluid is metered to the outlets 126 and 127 will be governed by the width, length and number of channels or grooves 144, and that any convolutions or warped surfaces which will allow fluid to leak by the gasket will suffice to permit fluid communication between the conduit 133 and the outlets 126 and 127.

The geometry or volumetric allowances between the head end 134 and the ramp 160 must be chosen carefully, in order that the pressure of moving the gasket 161 radially will not cause extrusion thereof into the channels or grooves to the extent of sealing the grooves against passage of fluid.

After the gasket 161 has reached the position indicated in FIG. 16, for all practical purpose metering through the channels or grooves 144 is almost instantaneous and at that time the full area A–4 of the head end 134 is exposed to hydraulic pressure and the gasket then moves radially inwardly a small amount decreasing its deformation, as is evident in FIG. 17. (It should be noted however, in the quiescent and low pressure states the effective area of the head end 134 of the piston 132 is less than the area A–5 of the end 135 due to the position of the gasket 161.) At any rate, the exposure of the full area A–4 of the head end 134 causes an imbalance in forces which opposes the spring compression force and which permits movement of the spool in a rearward direction, or to the right. In this manner, even under conditions of extremely rapid pressure rises, a smooth metering of pressure is provided to the outlets 126 and 127.

When the pressure applied to the inlet 125 times the area A–5 plus the spring compression pressure is equal to the inlet pressure times the area A–4, the piston or spool 132 is in a state of hydraulic balance. When the pressure at the inlet 125 is increased beyond this point, hydraulic imbalance occurs and the pressure times A–4 causes the piston 132 to move until it assumes a position such as shown in FIG. 18. In the present instance, the inlet pressure which causes the spool or piston 132 to reach a state of balance is approximately 300 p.s.i. and because of the constantly increasing spring tension as the piston moves to the right, the pressure at which the spool 132 moves against its right hand seat, as illustrated in FIG. 18 is approximately 400 p.s.i. It should be noted at this point that the movement of the piston to the right permits the O-ring or gasket 161 to once again assume its normal position and allows undiminished pressure to be communicated from the inlet 125 to the outlets 126 and 127.

It should also be noted at this time that the conical ramp 160 is employed to maintain better gasket control with the spool for a longer interval of spool travel than would be the case if this ramp were a circular ring perpendicular to the axis of the spool. In this manner, a smoother "feathering" or "blend" of input to output pressure is obtained.

Upon the release of master cylinder pressure, as when the driver releases the foot pedal on the vehicle, it is necessary that the valve return quickly and efficiently to its former quiescent state. This is achieved by the flow following first the path heretofore described, i.e. through the channels 144, past the piston head 132 and through the conduit 133 to the master cylinder via the inlet 125, until the spool starts its travel in the reverse direction, i.e. towards the left and its quiescent state, minus any small hysteresis losses. Of course, with the spool in the quiescent state, reverse flow through the valve is prevented by the gasket 161 and at that time, as illustrated in FIG. 19, the check valve 145 moves rearwardly against its biasing means or spring 146 permitting pressure communication between the outlets 126 and 127 and the inlet 125, until the residual pressure of the spring is reached. It has been found that the pressure of the spring 146 should preferably be relatively low, so that the check valve or poppet 145 closes off at approximately 1–3 p.s.i.

In accordance with another feature of the invention, the bleeder mechanism 150, having the external actuator pin 151 may be used to depress the poppet valve 145 so as to permit bleeding of the front brakes and purging them of air. To this end, the bleeder mechanism 150, best illustrated in FIG. 11, comprises a piston having a pair of spaced annular shoulders 152 and 153 housing therebetween an O-ring seal 154. Projecting from the shoulder 153 is a flange 155 which serves to embrace a biasing means, in the present instance a spring 156 to hold the bleeder mechanism 150 to the left. A pin 157, connected on the flange 155 and axially aligned with the poppet or check valve 145, may engage the poppet valve by pressing the actuator pin 151 in against the biasing pressure thus permitting the front brakes to bleed and be purged of all air therein.

It should be noted that the metering and delay valve 120 may also be utilized in brake systems that are all disc or all shoe by merely plugging the outlet 129 and connecting the outlet 126, for example, to the front brakes and the outlet 127 to the rear brakes. In this manner, all four brakes would be subject to the metering and delay function, as hereinabove described.

It should also be recognized that the metering and delay valve of the present invention provides an added safety feature. For example, on dry pavement, a concrete road surface which is in good condition yields approximately a .9 adhesion level. Under these conditions, normal brakes (not including a relay valve as heretofore described), will skid the rear end of the vehicle on a spike test (spike test—panic stop). On the other hand, on the same type of road surface but which is wet, has icy spots or oil thereon, the adhesion level may drop to .3. Under these conditions, a vehicle not equipped with the delay valve but having conventional disc or shoe type brakes which are properly adjusted, will cause the front brakes to prematurely lock causing the vehicle to swerve or skid out of control. Lowering the de-acceleration rates and/or delaying the front brakes by means of the metering and delay valve provides an additional safety factor not heretofore known.

Thus the metering and delay valve 120 meters and delays the application of hydraulic pressure to brakes, and is especially useful in brake systems employing disc type brakes whereby the disc type brake will not be affected by the operator of the motor vehicle "riding" the brake pedal.

*Metering, delay and proportioning valve*

It has been found that in vehicles having either all disc type brakes in the brake system but having varying weight distribution, or having a hybrid brake system such as shown in FIG. 1, it is preferable to combine a metering and delay valve, such as the valve 120 as described above, with a proportioning valve, such as the valve 20 also above described. To this end, the metering, delay and proportioning valve 220 illustrated in FIG. 10, comprises a metering and delay valve section 225 and a proportioning valve section 240, similar to those valves as heretofore described.

As the proportioning valve 20 and the metering and delay valve 120 is adequately described hereinbefore, suffice to say that the outlet end 229 of the section 225, corresponding to the rear brake outlet 129 of the metering and delay valve 120 is provided with a threaded section 230 for engagement with the inlet of the proportioning section of the valve 240.

The only difference in the proportioning valve 240 section of the metering, delay and proportioning valve 220 is the biasing means circumscribing the annular spool 250, in the present instance the biasing means comprising a toroidal compression spring 260 in lieu of the conical spring means 39, illusrtated in FIG. 6. In operation the master cylinder is connected to an inlet 221 and parallel flow takes place through the proportioning valve 240 and the metering and delay valve 225, in a manner as has previously been described. As shown in FIG. 10, the metering and delay valve 225 section of the metering, delay and proportioning valve 220 is provided with at least one outlet, in the present two designated 222 and 223 for purposes for identification, which may connect the disc brakes 11 via the hydraulic piping 16. In addition, the proportioning valve 240 section of the metering, delay and proportioning valve 220 is provided with an outlet 224 which connects the rear shoe type brakes 13 via the hydraulic piping 15.

The operation of the metering, delay and proportioning valve 220 is as has been previously described and may be graphically seen by superimposing the graph of FIG. 29 over the graph in FIG. 30.

*Meter and proportioning valve*

In certain instances it may be necessary, in heavier motor vehicles and the like, to not only proportion the pressure to the rear wheels in hybrid brake systems but also to meter the pressure to the front wheels. Once again it should be recognized that the valve assembly defined hereinbelow is also applicable to a brake system having all disc brakes or all shoe brakes where it is desired to compensate for differences in weight distribution in the vehicle. In addition, the valve described hereinbelow is particularly useful in brake systems wherein no power assist is provided or where the delay function as described in the section of the specification entitled "Metering and Delay Valve" is not desired.

Figure 5:
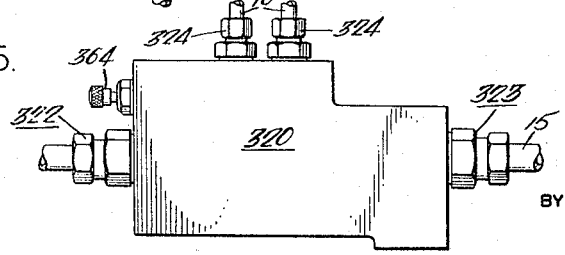
FIG. 5 is an enlarged profile of a metering and proportioning valve for placement in the blank box illustrated in FIG. 1.

In accordance with the invention, the metering and proportioning valve 320 meters, proportions, and programs the sequential operation of the hydraulic pressure to both the disc brakes 11 and the shoe brakes 13, solely by hydraulic imbalance. To this end, the valve 320 comprises a valve body 321 having a hydraulic fluid inlet 322 and at least two outlets 323 and 324. As illustrated in FIG. 5 the first outlet 323 is connected to the rear shoe brakes 13 via the hydraulic piping 15 while the second outlet 324, in the present instance two, operating in parallel, connect the front disc brakes 11 via the hydraulic piping 16.

Between the inlet 322 and the first outlet 323 is a bored hole 325 having slidingly mounted therein a spool 326, having an inlet end 326a and an outlet end 326b and movable between a first position, to the right as illustrated in FIG. 20, and a second position, to the left as illustrated in FIG. 20, and a second position, to the left as illustrated in FIG. 21. Adjacent the inlet 322 and mounted within the body 321 is a sleeve 327 having a hollow interior forming a first chamber 328, communicative at one end 329 through a passage 330 with the inlet 322, and circumscribing the inlet end 326a of the spool 326. At the other end of the sleeve 327 is an O-ring seal 331 which sealingly engages the spool 326 as it moves between the first and second positions.

In order to provide communication between the inlet 322 and the first outlet 323 so that hydraulic pressure applied at the inlet 322 may also be applied at the outlet 323, the spool 326 contains means defining an aperture or conduit 332 connecting the first chamber 328 and the outlet 323.

At the outlet end 326b of the spool 326 are a pair of spaced annular shoulders 333 and 334 having an annular seal 335a, such as an O-ring, mounted therebetween. (See FIG. 20.) The shoulders 333 and 334 are positioned in a second chamber 336 formed in the body 321 and having axially spaced, radially extending end walls 337 and 338. A second seal 335b is positioned adjacent the wall 337 and like the seal 331, sealingly engages the spool 326. Between the end wall 337 and the first shoulder 333 of the spool 326, is biasing means, in the present instance a compression spring 339 which ends, prior to the application of hydraulic pressure to the spool through the inlet 322, to keep the spool in its first position, i.e. towards the right as illustrated in FIG. 20.

In order to permit axial movement of the spool 326 between its first and second positions, solely by hydraulic imbalance, and to permit the movement of the spool to overcome the compression of the spring 339, the area of the second shoulder 334, exposed to the hydraulic fluid at the first outlet 323 and designated A–6 for purposes of identification, is greater than the area A–7 exposed to the hydraulic pressure from the inlet 322. Thus, upon receipt of sufficient pressure to overcome the spring force, the spool moves to the left until the resultant hydraulic force exerted against the area A–6 is equal to the sum of the resultant hydraulic force exerted against the area A–7 and the spring force. At this position a state of balance will occur.

After the outlet 323, and thus the shoe type brakes 13, have received a certain predetermined amount of pressure, usually enough pressure to overcome the slack in the linkage and to permit the shoes to come into close proximity to the drum, it is desirable at that time to permit pressure equal to that existing at the rear shoe brakes to be applied also to the forward disc brakes 11. To this end, adjacent the inlet 322, is a third chamber 340, also communicative with the inlet 322. A branch passage 341 connects the third chamber 340 to a passageway 342 having a connecting passageway 343 communicative with the bored hole 325.

As illustrated in FIG. 20, the spool 326 has an annular recessed portion 344 having a tapered leading edge 345 and a tapered trailing edge 346. In the present instance, when the spool 326 is in its first position, the tapered leading edge is positioned adjacent the connecting passageway 343. (See FIG. 20.) Axially spaced of the bored hole 325 from the connecting passageway 343 is another passageway 347 connecting the second outlet 324. The axial spacing of the annular recessed portion, including the tapered, leading and trailing edges, is such that upon reaching the pressure at which the shoes of the brakes 13 lie closely adjacent the brake drums, the connecting passageway 343 becomes communicative with the passageway 347 via the annular recessed portion 344. (See FIG. 22.)

At a predetermined higher pressure it is desirable to lower the rate at which the pressure applied to the rear shoe brakes 13 through the outlet 323 increases, while maintaining the pressure rate increase to the forward disc brakes undiminished. In the present instance the metering and proportioning valve 320 programs the decrease in the hydraulic pressure rate. As hydraulic pressure increases, the spool 326 gradually moves to the left, as seen in FIG. 21 until it reaches a position closing off the first chamber 328. To this end, and as was described in the section entitled "Proportioning Valve," the inlet end 326a of the spool 326 has a nose cone 348 connected thereto, which nose cone includes a conical or tapered lip portion 349 for seating in a like conical seat 330a in the passage 330 of the sleeve 327.

When the spool 326 is in its second position and the nose cone 348 is positioned in the seat 330a of the sleeve 327, as illustrated in FIG. 21, a different area, designated in the present instance A–8, is exposed to the hydraulic pressure from the master cylinder 18. In the present instance, the area A–8 is less than either the area A–6 or A–7, whereby after the valve has reached the second position, the pressure at the first outlet 323 will remain at the pressure which caused the spool 326 to reach the second position, plus the ratio of A–8:A–6 times the difference between the new hydraulic pressure at the inlet 322 and the pressure of closing.

Upon release of the foot pedal 19a, and reduction of the hydraulic pressure to the inlet 322, it is desirable that the brakes 11 and 13 be immediately de-energized. To this end, each of the brake outlets, i.e. the first outlet 323 and the second outlet 324, is provided with spring loaded check valves which, as pressure is applied, are maintained in a state of hydraulic balance as the hydraulic fluid applied to the bottoms thereof tends to keep the check valves closed. In the present instance, a poppet or check valve 355 having a conical disc 356 seats in a passage 357 in the body 321, which passage is connected to the first outlet 323. As illustrated in FIG. 20, the bottom of the disc is communicative with the fluid in the passageway 342, which keeps the valve 355 closed as pressure is applied. It should be noted that upon release of pressure at the inlet 322 and thus the passageway 342, the poppet 355 acts to initially bleed pressure from the outlet 323 and thus the rear shoe brakes 13 and permits the passage of hydraulic fluid through the passageway 342 into the third chamber 340 and back into the master cylinder 18. Upon the spool 326 moving back towards its first position, and the nose cone 348 disengaging the seat 330a of the sleeve 327, release of pressure is also experienced through the aperture 332, the first chamber 328, and thus to the master cylinder 18.

In a like manner, the second outlet 324 is provided with a spring loaded poppet or check valve 360 having a conical disc 361 seating in a portion of the passageway 347 which, upon release of pressure backs off its seat permitting hydraulic fluid pressure to be released to the master cylinder through a branch passageway 362 communicative with the third chamber 340. In addition, release of pressure will also occur through the passageway 347, and the annular recess 344 until the spool 326 has moved to the point where the recessed portion 344 is no longer in registry with the passageway 347 and the connecting passageway 343.

Figure 31:
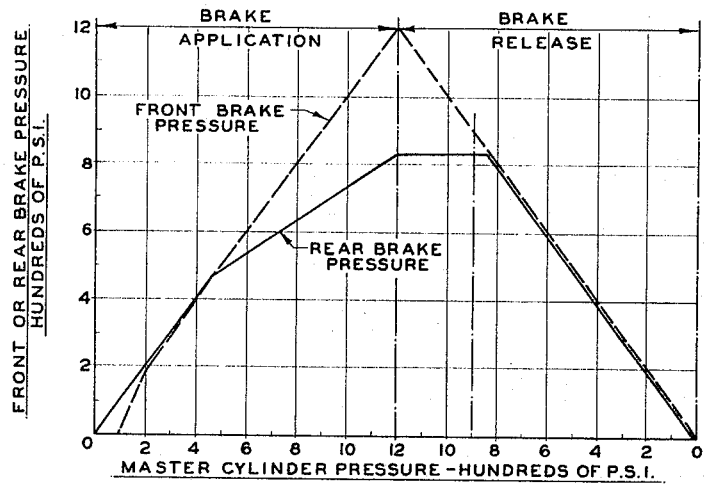
FIG. 31 is a graphic representation of the operation of a braking system having a metering and proportioning valve of the present invention.

At this point it is best to consider the operation of the metering and proportioning valve 320 for both brake application and brake release. The graph of FIG. 31 gives exemplary pressures utilizing the brake system illustrated in FIG. 1. As may be seen in FIG. 31, the dotted line represents the front brake pressure while the rear brake pressure is designated by the solid line. Further, as labelled, the inlet pressure or master cylinder pressure is designated along the axis of abscissas while the axis of ordinates designates the front and rear brake pressure.

As noted in the graph, upon application of master cylinder pressure to the inlet 322, and thus the first outlet 323 through the aperture 332 of the spool 326, the pressure exerted on the shoulder 334 times the area A–6 tends to overcome the biasing pressure of the compression spring 39 causing the spool 26 to move to the left as illustrated in FIG. 20. Upon reaching a certain predetermined pressure, in the exemplified instance 100 p.s.i., the annular recessed portion 344 of the spool 326 permits communication of the hydraulic pressure exerted in the passageway 342 via the connecting passageway 343 with the passageway 347. (See FIG. 22.) As some flow is experienced between the connecting passageway 343 and the passageway 347, some throttling occurs which gives to the dotted line a slight slope until the master cylinder pressure is effective at both the second and the first outlet in an undiminished amount. Upon continued application of master cylinder pressure, the resultant force of the inlet pressure against the area A–6 overcomes the spring force and the inlet pressure times the area A–7. At a certain point, in the present instance at 450 p.s.i., the spool has moved to its second position sealing the first chamber 328, thereby preventing further increments of pressure from reaching the outlet 323 as the area A–8 of the nose cone 348 is less than the area A–6, in the persent instance the area A–8 being approximately 40% to 45% of the area A–6, any further pressure increase applied by the master cylinder, will only be partially reflected at the outlet 323 conecting the shoe brakes 13. For example, if the spool is in the second position at a pressure of approximately 450 p.s.i., and assuming that the area of the nose cone, i.e. A–8, is 43% of A–6, and assuming a brake pressure of 850 p.s.i., the pressure exerted upon the rear brakes 13 is: 450 p.s.i.+.43 (850−450)=622 p.s.i. Thus after the spool 326 is in the second position, the rate of pressure increase to the rear brakes 13 is diminished while the pressure exerted upon the disc brakes 11 equals the master cylinder pressure.

Upon releasing the brake pedal 19a, pressure at the inlet 322 is diminished causing the hydraulic pressure to be released from the disc brakes 11 through both the poppet valve 360 and the passageway 347, the annular recessed portion 344 of the spool 326, and then through the passageway 342 to the third chamber 340. Upon pressure in the outlet 323 exceeding the spring pressure of the poppet valve 355, plus the pressure in the passageway 342, the hydraulic pressure existing at the shoe brakes 13 will be relieved through passageway 342, the branch passageway 341, and into the third chamber 340. Thereafter, the brakes will be in a released condition as the pressure applied to both the forward disc brakes and the rear shoe brakes is undiminished to zero.

As may be seen, if the forward disc brakes 11 do not receive hydraulic fluid until a certain finite pressure has been reached, in the present example 100 pounds, it is difficult without pumping the pedal 19a to bleed the front disc brake lines or hydraulic piping 16. In order to permit hydraulic fluid to flow through the hydraulic piping 16 to the disc brakes 11 to permit bleeding the lines of any entrapped air, means are provided to cooperate with the poppet valve 360 to move it off its seat thereby permitting a flow of hydraulic fluid from the third chamber 340 through the branch passageway 362 and into the passageway 347. To this end, as illustrated in FIG. 20, the release means for the poppet valve 360 may comprise a stem 364 connected at one end to the poppet valve 360, the stem passing through a nipple and packing gland 363 exteriorly of the body 321 whereby upon actuation of the stem, the poppet valve 360 moves off its seat to provide a flow between the third chamber 340 and the passage 347.

Of course other release means may be used in conjunction with the poppet valve 360, for example, a spring loaded release means may be provided to engage the conical disc 361 of the valve 360. As illustrated in FIG. 27, a spring loaded stem 365 may be mounted through a packing gland 366 perpendicular to the axis of the poppet, to engage the frontal surface of the conical disc 361 thereby camming the poppet valve 360 to the left and permitting a flow of hydraulic fluid through the branch passage 362 into the passageway 347.

Another way in which the poppet 360 may be disengaged from its seat manually so as to enable a flow through the passageway 347 to the forward disc brakes 311, is by providing a release means or stem 367 axially supported by a packing gland nipple 368 in the passageway 347 adjacent the poppet 360. The release means, in this instance as illustrated in FIG. 28, is biased away from the poppet by a spring 369 and is provided with means to permit engagement of the stem 367 with the conical tapered disc 361 of the poppet 360, thus permitting the disc to be cammed off its seat whereby the hydraulic fluid may flow between the passageway 362 and the passageway 347.

In order to prevent hydraulic fluid from entering the second chamber 336 causing additional pressure which would tend to keep the spool 326 in its first position, the second chamber 336 should be vented to the atmosphere. However, if either of the seals 335a or 335b become ruptured, an immediate release of pressure will occur by the hydraulic fluid flowing into the second chamber 336 and out through a vent hole 336a associated therewith. In order to prevent immediate loss of the brakes, which would occur if either of the seals 335a or 335b were ruptured, a sintered porous bronze insert 336b may be placed in the body 321 in the atmospheric vent. As the sintered porous bronze has sufficient porosity to permit air and hydraulic fluid flow therethrough, the second chamber 336 is vented, during normal operation, to the atmosphere, but under conditions of either of the afore-mentioned seals being ruptured, a sufficient time lag would be encountered by the hydraulic fluid passage into the vent through the bronze insert to prevent immediate loss of the brake. It should be noted that the "proportioning" valve 20, as described in the pertinent section above, also contains this feature. (See FIG. 6.)

In certain brake systems, especially of the shoe brake variety, after the brakes have been cycled repeated for a period of time, wear occurs on the connecting linkage between the shoes and the pivots associated with the shoes. The resultant wear causes undesirable noises due to the vibration of the parts, the vibration further increasing the wear. In order to compensate for wear and simultaneously prevent increased wear due to the vibration of the parts, it is desirable to maintain a small increment of pressure on the shoe type brakes to take up this slack. To this end, and in accordance with another feature of the invention, an arresting valve 425 may be positioned in a modified nipple 426 of the hydraulic outlet 323 connected to the shoe brakes 13. (See FIG. 24.) As the remainder of the metering and proportioning valve 320 is identical to that previously described with reference to FIGS. 20–23 and FIG. 31 and operates in a manner substantially identical thereto, like parts will be identified with like numbers for purposes of reference.

In the present instance, and as illustrated in FIG. 26, the arresting valve 425 comprises an insert 430 having a circular outer periphery 432 and axial slots 431 adjacent the periphery 432. The axial slots 431 have a radial depth sufficient to permit transfer of hydraulic fluid pressure from the aperture 332 in the spool 326 to the hydraulic outlet 323, when the insert 430 is mounted and pressed against an annular wall 426a of the nipple 426. When mounted in this position, a frontal portion 433 of the insert 430, having an annular concentric groove 434, and a rearwardly tapering wall 433a mounts on O-ring or annular seal 435 therein, which seal overlies the passage 357 in which the poppet valve 355 is seated.

In operation, the arresting valve serves to maintain, even when no hydraulic pressure is applied by the master cylinder, a finite pressure in the hydraulic outlet 323 connected to the shoe type brakes 13. As previously explained, upon releasing the brake pedal 19a and thus decreasing the hydraulic pressure to the inlet 322, the spool 326 moves from its second position towards its first position. When the pressure in the system has dropped to a certain value, for example 40 p.s.i., the first shoulder 334 of the spool 326 will contact the protuberant peripheral edge of the O-ring 435. (See FIG. 24.) As the pressure in the system drops further, the spool 326 continues to its first position, i.e. in metal to metal contact between the face of the shoulder 334 and the face of the frontal portion 433 of the insert 430. As illustrated in FIG. 25, the fluid pressure in the hydraulic outlet 323 can no longer return via the aperture 332 in the spool 326 to the inlet 322 because of the position of the O-ring between the shoulder 334 and the insert 430.

However, dependent upon the seating pressure of the poppet valve 355, for example 20 p.s.i., the fluid pressure from the rear brake line may be discharged through the axial slots 431 into the passageway 357 until the seating pressure, 20 p.s.i., is reached. Thereafter, the poppet valve 355 will close, thus entrapping a pressure approximately equal to the seating pressure of the poppet valve 355. Thus regardless of the pressure decrease in the aperture 332 of the spool 326, the minimum pressure trapped in the brake lines extending from the outlet 323 will be approximately equal to the pressure value necessary to overcome the poppet valve 355.

Upon re-application of pressure to the aperture 332 of the spool 326, hydraulic pressure is applied to the bottom of the poppet valve 355 thus preventing pressure from being returned to the rear brake lines through the rear brake poppet valve 355. As increased pressure is applied, and as illustrated in FIG. 25, the O-ring expands radially, leaving its containing groove 434 and moving up the radially tapered wall 433a of the groove permitting the hydraulic fluid to exert its pressure through the axial slots 431 thus applying pressure to the rear shoe type brakes 13. At the pressure at which the spool starts to move to the left, i.e. approximately 40 p.s.i., the O-ring reseats in its groove 434 for recycling.

Thus the arresting valve 425, in conjunction with the poppet check valve 355 operates as a bidirectional check valve, the movement being actuated by the dissimilar pressures occurring at preset and predetermined values.

It should be noted that although the metering and proportioning valve 320 as heretofore described has particular application in hybrid systems having disc type brakes on two of the wheels of a vehicle and shoe type brakes on the other two wheels, the valve of the present invention may also be used in connection with conventional shoe or disc brakes fitted on all wheels of the vehicle wherein differential pressure and pressure rates are desirably applied to one or the other pair of wheels to compensate for differences in weight distribution and the like.

In summary, the present invention provides a valve and valve combination for proportioning, and/or metering, and/or delaying a hydraulic fluid pressure communication between the inlet and outlet of the valve or valve combination. In addition, the valve or valve combination of the present invention is particularly applicable to vehicular hydraulic brake systems wherein it is desired, either due to differences in brake types or due to variances in weight distribution, to proportion the pressure increase to one or the other pairs of wheels and/or meter the same and/or delay the application of pressure thereto.

Thus although the invention has been described with a certain degree of particularity, it should be understood that the present disclosure is only exemplary of the invention, and that numerous changes in the details of construction, and the combination and arrangement of parts may be made without departing from the spirit and scope of the invention as hereinafter claimed.

What is claimed is:

1. A hydraulically operated metering, proportioning and delay valve; said valve comprising: a body having a hydraulic fluid inlet means and at least two hydraulic fluid outlet means; at least one spool means movable between a first position adjacent said first outlet means and a second position adjacent said inlet means; connecting means interiorly of said spool to provide hydraulic communication between said first outlet means and said inlet means when said spool is in its first position and means to seal said connecting means when said spool is in the second position, said spool having a proportioning ratio between the end thereof exposed to said first outlet and the end thereof exposed to said inlet such that the hydraulic force exerted on said spool at said first outlet is greater than the hydraulic force exerted upon said spool at said inlet; and check valve means between said first outlet and said inlet; said check valve normally closed when pressure is applied to said inlet and open upon release of pressure at said inlet; conduit means between said inlet means and said second outlet means; and means in said conduit responsive to the inlet pressure to delay the pressure communication between said inlet and said second outlet until a predetermined pressure is applied to said inlet.

2. A metering and delay valve comprising: a body portion having at least one inlet and spaced therefrom at least one outlet; an axially extending bore in said body portion and a tubular piston in said bore movable between a quiescent or first position proximate the outlet and a pressurized or second position adjacent the inlet; said piston having a larger cross sectional area at the end thereof proximate said outlet than the end thereof adjacent the inlet; check valve means in said bore between said piston and said outlet; said check valve means normally closed when pressure is applied at said inlet and open upon release of pressure; said check valve means including a housing connected in said bore having channel means communicative with said larger cross sectional end of said piston and said outlet means; radially expansible gasket means between said channel means and the interior of said piston, sealing the interior of said piston from said channel means until the internal pressure against said gasket means radially expands the same a predetermined amount permitting fluid communication between said inlet and said outlet.

3. A hydraulically operated metering and delay valve comprising: a body portion including a bore; spaced inlet and outlet means communicative with said bore; tubular piston means including biasing means for retaining said piston in a quiescent or first position away from said inlet means; said piston having a larger area exposed to said outlet than the area thereof exposed to said inlet whereby upon hydraulic inlet pressure reaching a predetermined value said piston will commence movement towards a pressurized or second position adjacent said inlet; a check valve means positioned in said bore between said piston and said outlet means; channel means communicative between the interior of said piston means and said outlet means and pressure sensitive means positioned between said channel means and the interior of said piston means closing off fluid communication between said inlet and said outlet until an inlet pressure has been reached causing movement of said pressure sensitive means and permitting pressure communication between said inlet and said outlet.

4. A valve in accordance with claim 3 wherein said check valve means includes a housing, and wherein said channel means includes a plurality of grooves about the periphery of said housing.

5. A valve in accordance with claim 4 wherein the portion of said housing adjacent said one end of said piston includes a conical ramp symmetrically positioned about the longitudinal axis of said piston, and wherein said presure sensitive means comprises a toroidal, radially expansible elastomeric gasket.

6. A valve in accordance with claim 5 wherein said check valve means includes a plug mounted interiorly of said housing including biasing means to maintain said plug in its closed position with respect to said outlet, said plug including an aperture therein having fluid communication between the interior of said housing and the interior of said piston, and a seal adjacent said plug to prevent fluid entering said housing from communicating with said outlet.

7. A valve in accordance with claim 3 wherein said piston biasing means maintains said piston in its first position until said pressure sensitive means permits fluid communication between said inlet and said outlet, whereby upon movement of said pressure sensitive means permits exposure of said larger area to the pressure at the inlet.

8. A valve in accordance with claim 7 wherein said biasing means includes a compression spring coaxially mounted with respect to said piston and circumscribing said piston: and vent means passing through said body to the atmosphere from said spring.

9. A valve in accordance with claim 3 including bleeder mechanism having means engageable with said check valve means to open said check valve means and permit fluid flow from said outlet to said inlet.

10. A valve in accordance with claim 9 wherein said bleeder mechanism includes a sealed flange portion mounted interiorly of said bore and having an axial projection aligned with the axis of said check valve and means extending outwardly from said flange to permit engagement thereof for actuating said bleeder mechanism.

11. A hydraulic brake system for use on a motor vehicle having front and rear wheels and comprising in combination: disc type brakes mounted on the front wheels of the vehicle and shoe type brakes mounted on the rear wheels of the vehicle, a master cylinder and a metering and delay valve, said valve having an inlet connecting said master cylinder, and means to apply hydraulic pressure from said master cylinder to said metering and delay valve inlet; said metering and delay valve having at least two outlets, said first outlet connecting hydraulic fluid to said rear shoe brakes, said second outlet connecting hydraulic fluid to said front disc brakes; said valve having means defining a bore between said inlet and said second outlet; tubular piston means including biasing means for retaining said piston in a quiescent or first position away from said inlet means; said piston having a larger area exposed to said second outlet than the area thereof exposed to said inlet whereby upon hydraulic inlet pressure reaching a predetermined value said piston will commence movement towards a pressurized or second position adjacent said inlet; a check valve means positioned in said bore betwen said piston and said second outlet means; channel means connecting the interior of said piston means and said second outlet means and pressure sensitive means positioned between said channel means and the interior of said piston means closing off fluid communicating between said inlet and said second outlet until an inlet pressure has been reached causing movement of said pressure sensitive means and permitting pressure communication between said inlet and said second outlet.

12. A hydraulic brake system in acocrdance with claim 11 including connecting means on said first outlet; and a proportioning valve connected to said connecting means for proportional communication of pressure from said master cylinder to said rear shoe brakes.

13. A hydraulic brake system in accordance with claim 12 wherein said proportioning valve comprises: a body having hydraulic fluid inlet means and hydraulic fluid outlet means; spool means movable between a first position adjacent said outlet and a second position adjacent said inlet; connecting means interiorly of said spool to permit hydraulic communication between said outlet and said inlet when said spool is in its first position, and means to seal said connecting means when said spool is in its second position; said spool having a proportioning ratio between the end thereof exposed to said outlet and the end thereof exposed to said inlet such that the hydraulic force exerted on said spool at said outlet is greater than the hydraulic force exerted upon said spool at said inlet.

14. A hydraulically operated proportioning valve for automotive braking systems; said valve comprising: a body having an inlet and an outlet; means defining a bore between said inlet and said outlet; an axially extending spool in said bore having an inlet end and an outlet end and movable between a first position adjacent said outlet and a second position adjacent said inlet, said spool having a larger cross sectional area at the outlet end than at the inlet end; biasing means connected to said spool to maintain said spool in the first position prior to the application of hydraulic pressure to said inlet; sleeve means circumscribing the inlet end of said spool and defining a chamber and having a passage therein communicative with said inlet, and a seat in said sleeve; a nose cone on the inlet end of said spool, said nose cone having a lip portion to engage said seat in said chamber to seal said chamber when said spool is in its second position; a conduit interiorly of and co-extensive with said spool and at least one aperture therein for permitting fluid communication with said chamber, and check valve means positioned in said conduit intermediate said passage and said outlet end of said spool; and biasing means for said check valve means whereby upon hydraulic pressure being greater at said outlet than at said inlet said check valve will release thereby equalizing pressure between said inlet and said outlet.

15. A proportioning valve in accordance with claim 14 wherein said nose cone comprises a hollow cylindrical member connected to said spool, said member being stiff yet resilient, and a stiffener inserted in said member having a leading edge lying closely adjacent said lip of said cone and axially spaced interiorly of said member, said stiffener having a greater stiffness than the stiffness of said member so as to axially support said member.

16. A proportioning valve in accordance with claim 15 wherein said lip of said cone is conically tapered and said seat in said chamber is conically tapered.

17. A proportioning valve in accordance with claim 14 including a second chamber circumscribing said spool adjacent said outlet, said chamber having axially spaced first and second end walls, at least one radially extending shoulder at the outlet end of said spool interiorly of said second chamber and adjacent said second end wall when said spool is in said first position; said biasing means comprising a compression spring, one end of said spring engaging said shoulder and the other end of said spring engaging said first end wall.

18. A proportioning valve in accordance with claim 17 including a second shoulder at said outlet end of said spool interiorly of said second chamber and spaced from said first shoulder, and sealing means positioned between said first and second shoulders to engage said spool and seal said second chamber from said outlet.

19. A hydraulic brake system for use on a motor vehicle having front and rear wheels and comprising in combination: disc type brakes mounted on said front wheels of said vehicle, and shoe type brakes mounted on the rear wheels of said vehicle; a master brake cylinder and a proportioning valve, said valve having an inlet connecting said master cylinder, and means to apply hydraulic pressure from said master cylinder to said proportioning valve inlet; hydraulic piping connected between said master cylinder and said proportioning valve and connecting said disc brakes; said proportioning valve having at least one outlet and hydraulic piping connecting said outlet to said rear brake shoes; means defining a bore between said inlet and said outlet of said valve; an axially extending spool in said bore having an inlet end and an outlet end and movable between a first position adjacent said first outlet and a second position adjacent said inlet; said outlet end of said spool having a larger cross sectional area than said inlet end; biasing means connected to said spool to maintain said spool in the first position prior to the application of hydraulic pressure to said inlet; a first chamber circumscribing said inlet end of said spool and a passage in said first chamber communicating with said inlet and having a seat therein; a nose cone on the inlet end of said spool; said nose cone having a lip portion to engage said seat in said chamber to seal said chamber when said spool is in its second position; a conduit interiorly of said spool and co-extensive therewith, said conduit connecting said first chamber with said outlet; and a check valve mounted in said conduit and biased to permit fluid communication between said passage and said conduit only when the hydraulic pressure at the outlet exceeds the fluid pressure at said inlet.

20. A hydraulically operated proportioning valve; said valve comprising: a body having a hydraulic fluid inlet and hydraulic fluid outlet, a bore extending between said inlet and said outlet, a spool slidably mounted in said bore and movable between a first position adjacent said outlet and a second position adjacent said inlet; conduit means connecting said inlet and outlet to permit hydraulic communication therebetween when said spool is in its first position; a nose cone mounted at the inlet end of said spool, said conduit means extending through said nose cone to provide fluid communication between said inlet and said outlet under selected operating conditions; means defining a chamber circumscribing said nose cone, means connecting said chamber with said conduit means; and a check valve in said conduit means intermediate said inlet and said connecting means and operable to prevent hydraulic pressure transmission from said inlet to said outlet; a seat for said nose cone at said inlet operable to be engaged thereby when said spool is in said second position to thereby close hydraulic communication from said inlet to said chamber, biasing means operable on said spool and tending to maintain said spool in said first position prior to application of hydraulic pressure to said inlet; said end of said spool adjacent said outlet having a greater cross sectional area than the cross sectional area of said spool exposed to said inlet when said spool is in a first position to provide a first proportioning ratio tending to cause said spool to move toward said second position upon application of hydraulic pressure to said inlet; said nose cone having a smaller cross sectional area exposed to hydraulic pressure than either of said afore-mentioned areas when said spool is in said second position and said nose cone is seated in said seat to provide a second proportioning ratio between said outlet and inlet spool ends whereby a portion of the hydraulic pressure increase at said inlet is reflected at said outlet by fluid communication and throttling between said nose cone and seat thereby reducing proportionately the pressure increase rate at said outlet.

21. A proportioning valve in accordance with claim 20 wherein said nose cone comprises a hollow cylindrical member connected to said spool, said member being stiff yet resilient, and a stiffener inserted in said member having a leading edge lying closely adjacent said lip of said cone and axially spaced interiorly of said member, said stiffener having a greater stiffness than the stiffness of said member so as to axially support said member.

22. A proportioning valve in accordance with claim 21 wherein said lip of said cone is conically tapered and said seat in said chamber is conically tapered.

23. A proportioning valve in accordance with claim 20 including a second chamber circumscribing said spool adjacent said outlet, said chamber having axially spaced first and second end walls, at least one radially extending shoulder at the outlet end of said spool interiorly of said second chamber and adjacent said second end wall when said spool is in said first position; said biasing means comprising a compression spring, one end of said spring engaging said shoulder and the other end of said spring engaging said first end wall.

24. A proportioning valve in accordance with claim 23 including a second shoulder at said outlet end of said spool interiorly of said second chamber and spaced from said first shoulder, and sealing means positioned between said first and second shoulders to engage said spool and seal said second chamber from said outlet.

25. A hydraulically operated proportioning valve; said valve comprising: a body having a hydraulic fluid inlet and hydraulic fluid outlet, an axially extending bore extending between said inlet and outlet; an axially extending spool in said bore having an inlet end and an outlet end and movable between a first position adjacent said outlet and a second position adjacent said inlet; a stiff yet resilient nose cone mounted at said inlet end of said spool, and a seat at said inlet operable to be engaged by said nose cone when said spool is in said second position; biasing means operable on said spool and tending to maintain said spool in said first position prior to application of hydraulic pressure to said inlet; a conduit extending interiorly of and coextensive with said spool and nose cone and means defining a chamber circumscribing said nose cone; means connecting said chamber with said conduit; and check valve means positioned in said conduit intermediate said inlet end of said spool and said connecting means, said check valve being operable to release hydraulic pressure from said outlet to said inlet upon an increased hydraulic pressure at said outlet greater than at said inlet; said spool and nose cone combination having at least three different cross sectional areas, the area at said outlet end of said spool exposed to outlet hydraulic pressure being greater than the cross sectional area exposed to inlet hydraulic pressure when said spool is in said first position, and said cross sectional area of said spool exposed to inlet hydraulic pressure when said spool is in said first position greater than the cross sectional area of said nose cone when said nose cone is engaged by said seat whereby the difference in cross sectional areas between the outlet end of said spool and said area exposed to inlet hydraulic pressure when said spool is in said first position tends to cause said valve to move towards the second position, and the relationship between the cross sectional area of said nose cone, when seated, relative to said outlet end cross sectional area permits a portion of the hydraulic pressure at said inlet to be reflected at said outlet but at a reduced pressure increase rate at said outlet.

References Cited by the Examiner

UNITED STATES PATENTS

| | | | |
|---|---|---|---|
| 2,207,173 | 7/1940 | Goepfrich | 188—152 |
| 2,916,884 | 12/1959 | Bricker et al. | |
| 3,173,264 | 3/1965 | Hazeltine | 60—54.5 |
| 3,245,221 | 4/1966 | James et al. | 303—6 X |
| 3,245,729 | 4/1966 | Shellhause | 303—6 X |

EUGENE G. BOTZ, *Primary Examiner.*